(12) United States Patent
Duchemin et al.

(10) Patent No.: US 8,335,674 B2
(45) Date of Patent: Dec. 18, 2012

(54) METHOD OF PRODUCING A FINITE-ELEMENT MODEL OF A UNIQUE BODY OF COMPLEX SHAPE AND STRUCTURE

(75) Inventors: Laure Duchemin, Massy (FR); Sébastien Laporte, Massy (FR); David Mitton, Le Kremlin-Bicetre (FR); Wafa Skalli, Paris (FR)

(73) Assignee: Societe d'Etudes et de Recherches de l'Ecole Nationale Superieure d'Arts et Metiers (Seram), Paris (FR)

( * ) Notice: Subject to any disclaimer, the term of this patent is extended or adjusted under 35 U.S.C. 154(b) by 827 days.

(21) Appl. No.: 12/300,314

(22) PCT Filed: May 11, 2007

(86) PCT No.: PCT/FR2007/000801
§ 371 (c)(1),
(2), (4) Date: Nov. 10, 2008

(87) PCT Pub. No.: WO2007/135267
PCT Pub. Date: Nov. 29, 2007

(65) Prior Publication Data
US 2009/0164176 A1 Jun. 25, 2009

(30) Foreign Application Priority Data
May 12, 2006 (FR) .................................. 06 04225

(51) Int. Cl.
*G06G 7/48* (2006.01)
(52) U.S. Cl. ...................... 703/7; 703/2; 703/6; 703/11
(58) Field of Classification Search .................. 703/2, 6, 703/11, 7; 345/419, 424; 382/128; 600/300, 600/425; 73/788; 700/187; 623/2.17
See application file for complete search history.

(56) References Cited

U.S. PATENT DOCUMENTS

| 7,499,845 B1 * | 3/2009 | Quincy et al. .................... 703/7 |
| 2002/0158870 A1 * | 10/2002 | Brunkhart et al. ............ 345/424 |
| 2003/0097175 A1 * | 5/2003 | O'Connor et al. ........... 623/2.17 |

(Continued)

OTHER PUBLICATIONS

Au et al., "Feature-based reverse engineering of mannequin for garment design," Computer Aided Design, Oct. 1999, pp. 751-759, 31.

(Continued)

*Primary Examiner* — Kandasamy Thangavelu
(74) *Attorney, Agent, or Firm* — Muncy, Geissler, Olds & Lowe, PLLC

(57) ABSTRACT

A method of producing a finite-element model of a unique body of complex shape having an outer surface that is known in the form of a cloud of points describing said surface analytically or algebraically in a determined frame of reference, the method comprising the steps of a) using a parameterizable and generic finite-element model made up of simple geometrical volumes and representative of the family to which the unique body belongs, b) adapting said model as a function of parameters describing the unique body that is to be modeled; c) in said frame of reference, adjusting the parameterized generic finite-element model and causing the surface nodes of said parameterized model to correspond to points of the known outer surface of the body by projecting said nodes onto said surface along a direction that is normal to the surface of the generic model, and d) using the nodes of the surface as control points for a three-dimensional interpolation method in order to personalize the internal finite elements of the generic model.

8 Claims, 2 Drawing Sheets

U.S. PATENT DOCUMENTS

| | | | | |
|---|---|---|---|---|
| 2004/0236552 A1* | 11/2004 | Pieper et al. | | 703/6 |
| 2005/0010106 A1* | 1/2005 | Lang et al. | | 600/425 |
| 2005/0131662 A1* | 6/2005 | Ascenzi et al. | | 703/11 |
| 2005/0143855 A1* | 6/2005 | Arai et al. | | 700/187 |
| 2005/0256686 A1* | 11/2005 | Stabelfeldt et al. | | 703/6 |
| 2006/0028465 A1* | 2/2006 | Imai | | 345/419 |
| 2006/0050073 A1* | 3/2006 | Kanai et al. | | 345/423 |
| 2006/0062442 A1* | 3/2006 | Arnaud et al. | | 382/128 |
| 2006/0069318 A1* | 3/2006 | Keaveny et al. | | 600/300 |
| 2006/0074613 A1* | 4/2006 | Oyama | | 703/2 |
| 2006/0123919 A1* | 6/2006 | Lovell et al. | | 73/788 |
| 2007/0027667 A1* | 2/2007 | Osborn et al. | | 703/11 |

OTHER PUBLICATIONS

Ma et al., "B-spine surface local updating with unorganized points," Computer Aided Design, Sep. 15, 1998, pp. 853-862, vol. 30, No. 11.

Peterson, J., "An openGL Implementation for Drawing Quadratic Lagrange Finite Elements Using Bezier Patches" (Online), Apr. 22, 2004, pp. 1-4, URL:http://web.archive.org/web/20040422032316/http://www.utexas.edu/peterson/talks/bezier/.

Ferreira et al., "Integration of reverse engineering and rapid tooling in foundry technology," Journal of Materials Processing, 2003, pp. 374-382, vol. 142.

Folwell et al., "Reliable whisker weaving via curve contraction," Engineering With Computers, 1999, pp. 292-302, vol. 15, No. 3.

\* cited by examiner

METHOD OF PRODUCING A FINITE-ELEMENT MODEL OF A UNIQUE BODY OF COMPLEX SHAPE AND STRUCTURE

BACKGROUND OF THE INVENTION

1. Field of the Invention

The present invention relates to a method of producing a finite-element model of a unique body of shape and structure that are complex, as applies to certain bones of the human or animal body.

2. Brief Discussion of the Related Art

Using finite elements to model a body of complex shape is nowadays a proven technique. It is used for simulation to predict the behavior of a body, of an article, or of a member, . . . under certain loading conditions representative of those it will encounter either while in normal operation or use, or else in situations that are exceptional.

The fields of use for such simulation are very diverse, going from computer-assisted surgery (orthopedic operations for repairing disorders due to an accident or to disease, possibly accompanied by installing an implant), to preventative medicine (in particular predicting the behavior of a bone element that is subjected to osteoporosis), and also including studying and analyzing the behavior of the human or animal body when subjected to various normal or abnormal conditions such as impacts that result from car collisions or from practicing a sports activity, . . . .

A model is produced on the basis of measurements taken from the body that is to be modeled by means of X-rays, photography, palpation, tomography, . . . , the measurements being digitized or subjected to any equivalent technique serving to obtain data about the outer shape of the body and about its inner structure.

The predictive function of modeling is made more precise by using a greater number of elements and by using a meshing (subdivision into coupled-together finite elements) that is satisfactory in terms of the shape of each mesh.

Meshing a real body requires preparation time that increases with increasing complexity of the body and with increasing requirement for the model to be accurate. Furthermore, an accurate model also requires a large amount of processing time while it is "in operation", i.e. computation time that is lengthy in order to obtain a realistic image of its behavior and of the way it deforms under such and such a mechanical load. Thus, the state of the art in this field comprises models that are produced to simulate behavior quickly but too crudely, or that are accurate but much too slow.

However, the need for personalized models of this type is both ever increasing and also ever more demanding in terms of response time. This applies in particular to the medical field and more particularly to the orthopedic field in which computer-assisted surgery is becoming ever more widespread. There is also an existing need in preventative medicine for simulating the behavior of a femur under such and such a stress and for deducing the degree of risk and in particular of breakage incurred by the subject.

SUMMARY OF THE INVENTION

The present invention seeks to provide a solution to the problem that is presently poorly resolved, of producing a model that is personalized, i.e. that takes fine account of the uniqueness of a body belonging to a family of similar bodies, while also being suitable subsequently for consuming only a minimum amount of computation time while being used for simulation purposes.

To this end, the invention thus provides a method of producing a finite-element model of a unique body of complex shape having an outer surface that is known in the form of a cloud of points describing said surface analytically or algebraically in a determined frame of reference, the method consisting in:

a) using a parameterizable and generic finite-element model made up of simple geometrical volumes;

b) adapting the model as a function of parameters describing the unique body to be modeled;

c) in the above-mentioned frame of reference, adjusting the position and the parameters of the above-mentioned model and causing the surface nodes of said parameterized model to correspond with points of the known outer surface of the body by projecting said nodes onto said surface in a direction that is normal to the surface of the generic model; and d) using the surface nodes as control points in a three-dimensional interpolation method for personalizing the internal finite elements of the generic model.

This method presents the considerable advantage of producing a finite-element model of any body quickly and of providing a personalized model of behavior during processing by application of external mechanical loads that is precise and thus representative of reality. The generic model is generated on the basis of in-depth knowledge of the family of bodies to be modeled that enables common characteristics to be extracted therefrom. For example, for the proximal end of a femur, the shape of the generic model will necessarily have the general appearance of two cylinders intersecting at an angle of about 130°, one corresponding to the shaft and the other to the neck, which neck has a spherical end, with a portion of the transition between the two cylinders being reduced to an association of truncated cones (having bases that are not strictly circular), together with a lateral projection for initiating the greater trochanter.

The descriptive parameters (length of the neck, diameter of the sphere, value of the angle between the neck and the shaft, . . . ) and also data relating to the outside shape (the cloud of points) of the unique body constituting the proximal end of the femur of a determined subject can be extracted from "measurements" made using ordinary equipment, in particular X-ray equipment, that is readily available for any practitioner.

The projection procedure for obtaining the unique shape from the shape of the parameterized generic model can be iterative and can comprise successive smoothing operations and new projection operations for the purpose of refining the result.

With a bone, a distinction is made between the (cortical) outer portion and the (spongy) inner portion, such that the body for modeling is presented as possessing an outer shell defined by an outer structure known by a first cloud of points and an inner structure known by a second cloud of points, the method of the invention then consisting, between above-mentioned steps c) and d), in causing the outer nodes of a finite-element underlayer of the generic model to correspond to points of the inner surface by projecting said nodes onto said surface in a direction normal to the outer surface of said underlayer, and in refining said correspondence by a procedure of successive smoothing and projection operations combined with account being taken of the link that exists between each node as projected in this way and the nodes of the outer surface to which it is connected, and in proceeding with above step d) by using the nodes as projected onto the inner surface as control points. The choice of the number of layers of finite elements allocated to representing the cortical bone is left to the initiative of the operator.

Advantageously, the meshing density of at least one simple geometrical volume and preferably of all the volumes is also parameterizable. This enables certain zones of the personalized model to be given special treatment (e.g. the neck of the femur if it is femur breakage that is of interest, or the greater trochanter if it is desired to simulate accurately the repercussions of a sideways fall onto this portion of the bone) so as to obtain greater accuracy in the simulation concerning the topic of interest.

Other characteristics and advantages of the invention appear from the description given below of an implementation of the invention as applied to a human femur.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and in which.

DETAILED DESCRIPTION OF THE INVENTION

Figure 1:
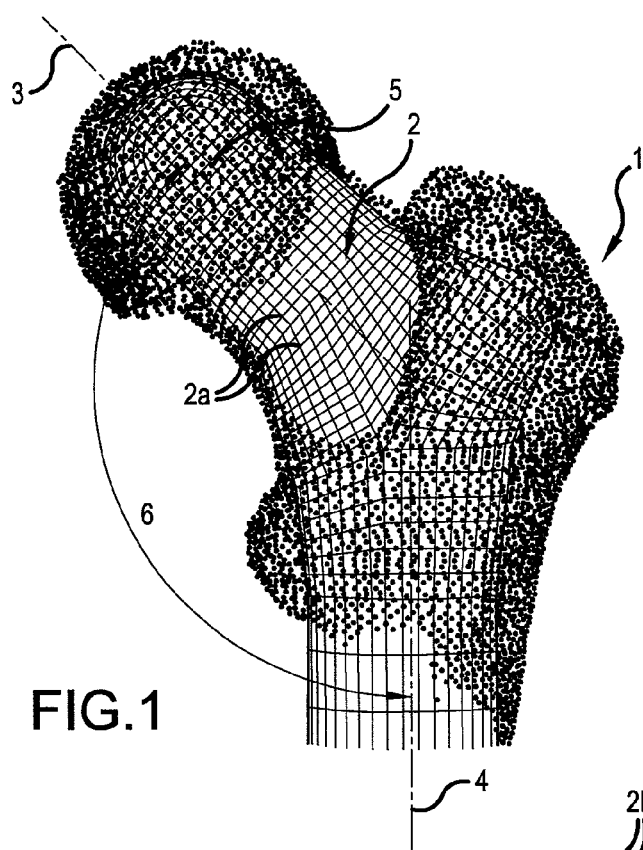
FIG. 1 is a diagram illustrating the initial stage of the method of the invention.

In FIG. 1, reference 1 represents (in part because of the need for clarity in the figure) a cloud of points that correspond, in a given frame of reference, to the outside surface of the head of a femur of a subject. This data is acquired by computerized measurement-taking and processing that are themselves known. In conventional manner, this cloud of points describes the entire outer surface in the frame of reference in question either analytically or else algebraically.

In the frame of reference, there is shown a model 2 of a femur head, which model is generic in the meaning of the invention such that the axis 3 of the neck and the axis 4 of the shaft, respectively of the real bone and of the generic model coincide, for example, as do the centers 5 of the sphere of the model and of the condyle of the joint between the femur and the pelvis, and as do the angles δ of the model and of the subject's femur.

Figure 4:
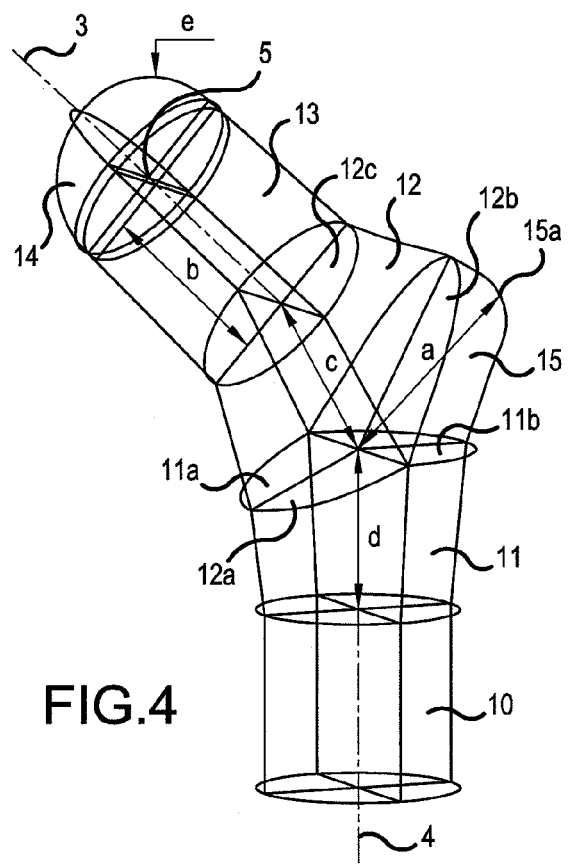
FIG. 4 shows simple geometric volumes of the generic model of a femur head for implementing the method of the invention.
Figure 5:
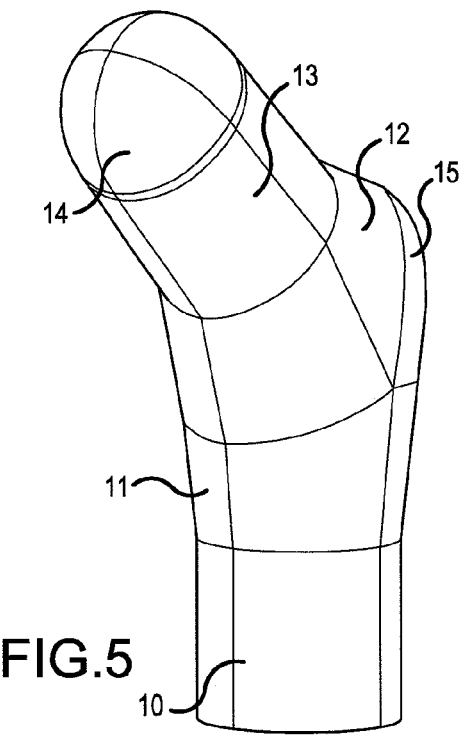
FIG. 5 shows how the simple geometric volumes are combined and adapted to form a femur head of a unique body.

The generic model is a finite element model that is described in greater detail with reference to FIGS. 4, 6 and 7, and there can be seen the nodes 2a that belong to the outer surface of the model.

After the generic model 2 has been placed in the frame of reference of the cloud of points 1, where necessary after parameterizing the model (i.e. setting values for its parameters), either beforehand or while it is being approximated to match the cloud of points, which model may include certain descriptive parameters that are suitable for being set, the method of generating the personalized model comprises the step of projecting the nodes 2a onto an outer surface defined by a first cloud of points 1 in a projection direction that is normal to the outer surface of the generic model containing the nodes 2a in order to generate the nodes 2a'. The procedure implemented may be iterative and may include successive operations of smoothing and of performing a new projection in order to refine the result. The methods implemented at this stage are known to the person skilled in the art.

Figure 2:
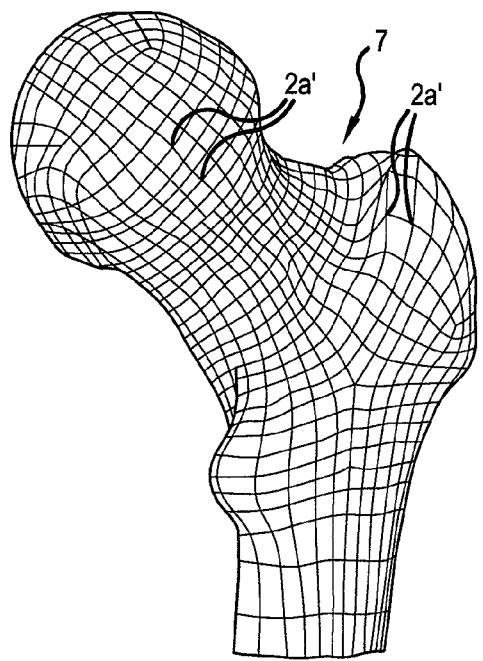
FIG. 2 and FIG. 3 show respectively the outer surface and the inner surface of the cortical bone of a femur head, as obtained by applying the method of the invention.

FIG. 2 shows the results obtained. The nodes 2a' are situated on the outer surface 7 that corresponds to the outer surface initially defined by the first cloud of points 1. Thereafter, continued generation of the personalized model consists in applying a three-dimensional interpolation method, and in particular the so-called "kriging" method using the surface nodes 2a' as a first set of control points while applying the method. In known manner, that method enables the shape of each finite element of the structure of the generic model to be adapted so as to best represent the structure of the real body.

Figure 3:
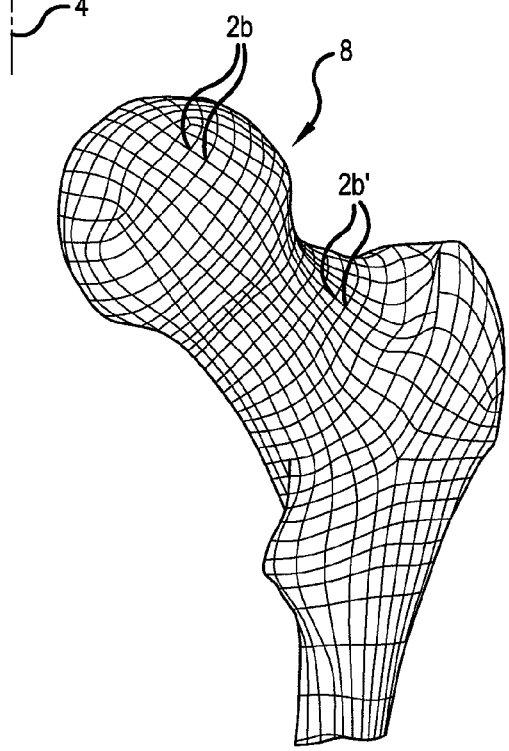

In the particular circumstance of a bone such as the femur, it is possible advantageously to take account of the special structure that it presents. The bone has a cortical outer portion that is like a shell, and an inner portion made of spongy bone and having mechanical properties that are very different from those of the outer portion. Computed tomography methods can be used for identifying the boundary between cortical bone and spongy bone. The boundary is a surface that is defined in a frame of reference determined by a second cloud of points like the cloud of points 1 in FIG. 1. For this application to a structure like bone that presents an outer shell containing an inner material, a refinement of the method of the invention consists in selecting, from within the generic model 2, an underlayer of finite elements and in proceeding to project the nodes 2b of the surface of this underlayer onto the inner surface of the cortical layer using the same method as described above, in order to generate the nodes 2b' on the surface defined by the second cloud of points. FIG. 3 shows the surface 8 formed by the set of nodes 2b' projected onto the inner surface of the cortical bone of the subject for whom the femur outer surface is modeled by the surface 7 in FIG. 2. Modeling of the finite element layer(s) (as selected by the operator) between those two surfaces, and personalization of the modeling are continued by kriging the inner structure of the generic model while using the projections 2b' of the nodes 2b contained on the inner surface 8 as a second set of control points for that purpose.

The method of the invention finds advantageous applications when it is necessary to model a large population of articles belonging to a common family, all presenting the same outer appearance but all being unique in terms of geometrical definition and fine mechanics. Naturally, once the personalization has been performed, each finite element of the structure must be given values that are representative of its mechanical characteristics such as its density, its Young's modulus, its Poisson coefficients, ... which values are themselves taken from the subject, so as to enable the model to provide a valid simulation of the behavior of the real article that it represents when particular loads are applied thereto, said loads themselves simulating the real stresses to which the article is subject, e.g. to which the femur is subject while walking or during a fall.

The quality of the personalized model obtained in accordance with the invention relies to a considerable extent on the design of the generic model.

A particular object of the invention is thus also to provide the generic model for a femur head that is suitable for rapidly modeling any femur head, with the personalized model as obtained in this way itself being suitable for being processed by computation in times that are compatible with real-time simulation.

The generic femur model of the invention is shown in FIGS. 4 to 7. On sight of these figures, it can be understood that the femur is reduced to a set of simple volumes that are themselves a kind of generic volume for each of the main portions of the femur, like a root that can be caused to vary in volume in simple manner by mathematical transformations that can be processed quickly by a computer (hardware and software) provided for this purpose.

Thus, there can be seen a first volume 10 that is cylindrical and that occupies the shaft portion of the bone. This volume is surmounted by a volume similar to a truncated cone 11 of axis substantially coinciding with the axis of the cylinder 10 extending from the cylinder and terminated at its top end by two planes 11a and 11b. The truncated cone 11 is itself surmounted by another truncated cone 12 intersected in its bottom portion by two planes 12a and 12b, the plane 12a coinciding with the plane 11a while the plane 12b is spaced apart from the plane 11b. The small base 12c of the truncated cone 12 is extended by a cylindrical portion 13 that constitutes the volume generating the neck of the femur. This volume is capped by a hemisphere 14 of center 5. the cylinder 13 has axis 3 while the cylinder 10 has axis 4. These two axes coincide within the volume 12 and between them they form the angle 6 that is defined in FIG. 1.

Between the planes 11b and 12b, the generic model shown has a volume 15 that can be said to be (geometrically) generated by moving the section 11b onto the section 12b while deforming its outline so as to pass through a furthest point 15a at known distance a from a point of intersection of the axes of the two truncated cones. This volume 15 thus constitutes the generic "bulge" of the greater trochanter. The point 15a of its outline is situated substantially in the plane defined by the axes 3 and 4, more or less on the bisector of the angle 6.

Figure 6:
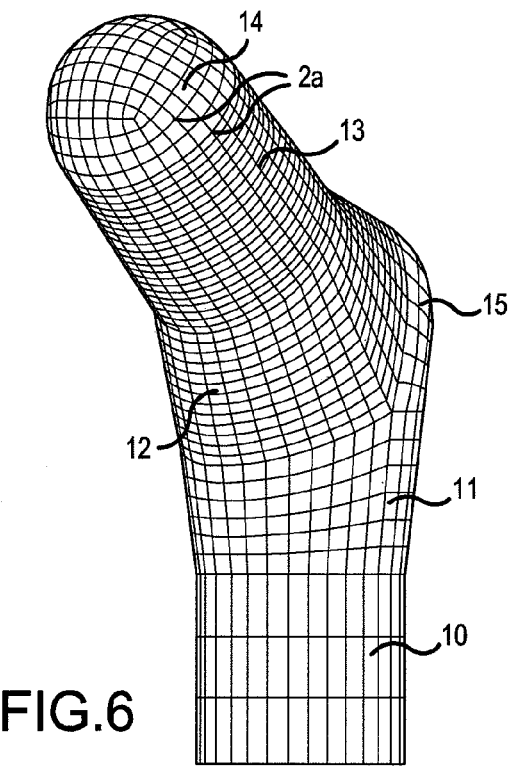
FIG. 6 shows the meshing of the outer surface of the femur head adapted to the unique body.

FIG. 6 shows the meshing of the outer surface of the femur head adapted to the unique body.

Figure 7:
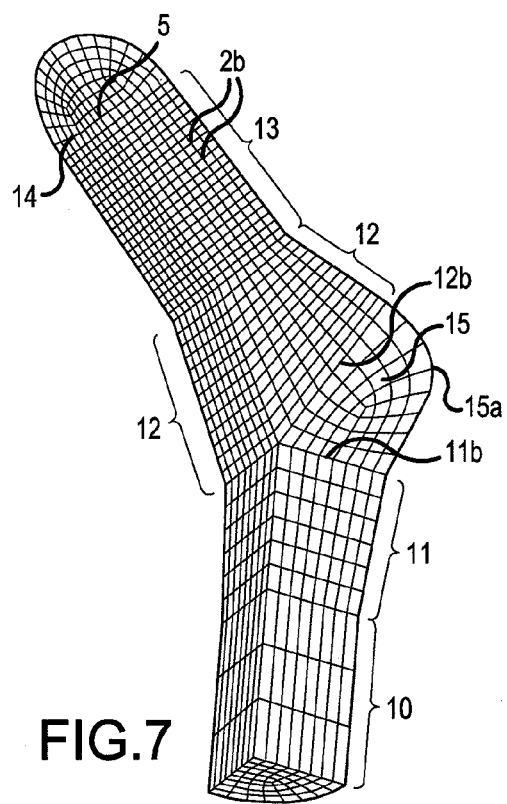
FIG. 7 shows the meshing of the inner surface of the outer shell of the femur head adapted to the unique body.

FIG. 7 shows the meshing of the inner surface of the outer shell of the femur head adapted to the unique body. It can be seen that the meshes made on these simple volumes are of regular shape, which means that it is possible to implement a transformation of large amplitude while ensuring that each mesh conserves a final shape that is suitable for ensuring that the personalized model behaves appropriately under the effect of simulated stresses. FIG. 7 shows the nodes 2b of the surface of the first underlayer of finite elements that are projected onto the inner surface of the cortical bone in order to form the surface 8 of FIG. 3.

It can be observed in these figures that the density of the meshes is greater over the cylinder 13 so as to increase the accuracy of results relating to the behavior of the neck of the femur while simulating mechanical loads.

As mentioned above, meshing density is a parameter that can be set for each of the simple volumes making up the generic model. The same applies for a certain number of the dimensions or geometrical characteristics of the generic model, such as the distance a of the furthest point 15a from the point of intersection of the axes of the truncated cones on the bisector of the angle between the axes of the two cylinders in the plane of the axes of the truncated cones, the length b of cylinder 13, the height c of the truncated cone 12, the height d of the truncated cone 11, the diameter e of the hemisphere of center 5, the value of the angle 6, etc.

The invention is described and explained above with reference to the end of a femur. Naturally, the method of the invention applies to any body of complex shape from which it is possible to extract a generic model made up of simple volumes (and therefore easy to mesh) and that is deformable using the above-specified method. In particular, most of the bones of the human skeleton can be modeled in this way in generic manner with parameters that can be set so as to make up a library of generic models suitable for use in constructing the model for a particular subject. This applies in particular to long bones such as the tibia (fibular) and the humerus, or other bones such as the pelvis, the lower jaw, . . . .

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing a finite-element model of a unique body of complex shape having an outer surface that is known by a first cloud of points describing said surface analytically or algebraically in a determined frame of reference, comprising the steps of:

a) using a generic finite-element model which is parameterizable by means of parameters, the model being made up of simple geometrical volumes that are representative of a family to which the unique body belongs, this model comprising internal finite-elements having surface nodes on outer surfaces of the simple geometrical volumes;

b) adapting the model as a function of parameters describing the unique body that is to be modeled;

c) within the frame of reference, adjusting position and/or the parameters of the generic finite-element model and causing surface nodes of the parameterized model to correspond with points of the outer surface of the body defined by the first cloud of points by projecting said surface nodes of the outer surfaces of the simple geometrical volumes onto said outer surface of the body along a direction that is normal to the outer surfaces of the generic model creating finite element nodes on the outer surface of the body; and d) using the finite element nodes on the outer surface of the body as a first set of control points in a three-dimensional interpolation method in order to personalize the internal finite elements of the generic finite-element model.

2. The method according to claim 1, further comprising the step of refining the correspondence by a method of successive smoothing and projection operations.

3. The method according to claim 1, in which the body from which a model has to be produced has an outer shell that is defined by the outer surface known by the first cloud of points and by an inner surface known by a second cloud of points, wherein the method further comprises, between steps c) and d):

causing outer nodes of a finite-element underlayer of the generic model to correspond to points of the inner surface of the outer shell by projecting said nodes of the underlayer of the generic model onto said inner surface defined by the second cloud of points in a direction normal to the outer surface of said underlayer, creating finite element nodes on the inner surface of the outer shell;

refining said correspondence by a procedure of successive smoothing and projection operations taking into account of a link that exists between each finite element node on the inner surface of the outer shell and the finite element nodes of the outer surface of the outer shell to which it is connected; and proceeding with above step d) by using the finite element nodes as projected onto the inner surface of the outer shell as a second set of control points.

4. The method according to claim 1, wherein at least one geometrical characteristic of the generic model is parameterizable.

5. The method according to claim 1, wherein at least one simple geometrical volume comprises internal finite-elements having a mesh that is parameterizable.

6. A method of producing a finite-element model of a proximal end portion of a femur in accordance with claim 1, wherein step a) consists of defining a generic model comprising:

a cylindrical volume occupying a shaft portion of the bone;

the shaft cylindrical volume surmounted by a shaft side truncated cone with its axis substantially coinciding with the axis of the cylinder, having a volume, being connected to the cylinder and terminating at its top portion in two planes;

said shaft side truncated cone being surmounted by a neck side truncated cone intersected in its bottom portion by two planes, one of which planes coincides with one of the two top portion planes, while the other plane is spaced apart from the other one of the two portion planes;

the neck side truncated cone having a small base that is extended by a cylindrical volume having an axis and generating a neck of the femur;

said neck cylindrical volume being capped by a hemisphere;

the axes of the two cylinders intersecting in the neck side truncated cone and forming between them an angle; and a trochanter volume that is geometrically generated by rotating the non-coinciding plane of the shaft side truncated cone onto the non-coinciding plane of the neck side truncated cone while deforming an outline of the trochanter volume so as to cause it to pass through a point remote from a point of intersection of the central axes of the shaft side truncated cone and the neck side truncated cone, the remote point situated in a plane defined by said axes of the shaft side truncated cone and the neck side truncated cone approximately on a bisector of the angle between the axes of the two cylinders.

7. The method according to claim 6, wherein the step a) further consists in parameterizing the generic model by changing at least one of values such as a distance a of the remote point of the trochanter volume from an intersection of the central axes of the shaft side truncated cone and the neck side truncated cone, a length b of the shaft cylindrical volume, a height c of the neck side truncated cone, a height d of the shaft side truncated cone, a diameter e of the hemisphere, a value of the angle between the axes of the two cylinders, and a mesh density allocated to each of the simple geometrical volumes of the generic model.

8. A method of producing a model according to claim 6 for predicting breakage of the neck of the femur, wherein the finite elements of the model have a mesh density that is greatest in a region which relates to the cylindrical volume that forms a generic portion of the neck of the genetic model under study.

* * * * *